(12) United States Patent
Kolias et al.

(10) Patent No.: US 8,909,674 B2
(45) Date of Patent: Dec. 9, 2014

(54) SYSTEM AND METHOD FOR TRACKING AND IDENTIFYING INTERESTS AMONG TENANTS FOR FOSTERING COMMUNITY RELATIONSHIPS

(71) Applicants: Sam Sotiros Kolias, Calgary (CA); Hugh Konstantine Kolias, Calgary (CA)

(72) Inventors: Sam Sotiros Kolias, Calgary (CA); Hugh Konstantine Kolias, Calgary (CA)

(*) Notice: Subject to any disclaimer, the term of this patent is extended or adjusted under 35 U.S.C. 154(b) by 150 days.

(21) Appl. No.: 13/755,608

(22) Filed: Jan. 31, 2013

(65) Prior Publication Data

US 2014/0214869 A1   Jul. 31, 2014

(51) Int. Cl.
*G06F 7/00* (2006.01)
*G06F 17/30* (2006.01)

(52) U.S. Cl.
CPC ................ *G06F 17/30386* (2013.01)
USPC ........... 707/790; 707/802; 707/803; 707/804; 707/805

(58) Field of Classification Search
CPC ............. G06F 17/30289; G06F 17/30292; G06F 17/30294; G06F 17/30297; G06F 17/30595; G06F 17/30604
USPC .................... 707/790, 802, 803, 804, 805
See application file for complete search history.

(56) References Cited

U.S. PATENT DOCUMENTS

| | | | |
|---|---|---|---|
| 2001/0037280 A1* | 11/2001 | Ingraham et al. | 705/37 |
| 2007/0174083 A1* | 7/2007 | Silverman et al. | 705/1 |
| 2008/0098313 A1* | 4/2008 | Pollack | 715/753 |
| 2008/0183701 A1* | 7/2008 | Furman et al. | 707/5 |
| 2010/0106534 A1* | 4/2010 | Robinson et al. | 705/5 |
| 2012/0192076 A1* | 7/2012 | Rocca | 715/738 |
| 2014/0129505 A1* | 5/2014 | Lin et al. | 706/50 |

* cited by examiner

*Primary Examiner* — Hares Jami
(74) *Attorney, Agent, or Firm* — McCarthy Tétrault LLP

(57) ABSTRACT

A system and method of managing interests and activities of residents and potential residents in a multi-unit building are provided. The method comprises: creating and maintaining a first set of records in the database for tenants, each record in the first set of records including fields for a name, contact information, building and interests; creating and maintaining a second set of records in the database for buildings, records in the second set including fields for a building name, address and amenities; creating and maintaining a third set of records in the database for activities, records in the third set including fields for an activity name, organizer, site, participants and activity details; analyzing the database to identify a set of tenant records in the first set of records that match an activity in the third set; and generating and sending notifications using contact information in the set of tenant records relating to the activity.

17 Claims, 13 Drawing Sheets

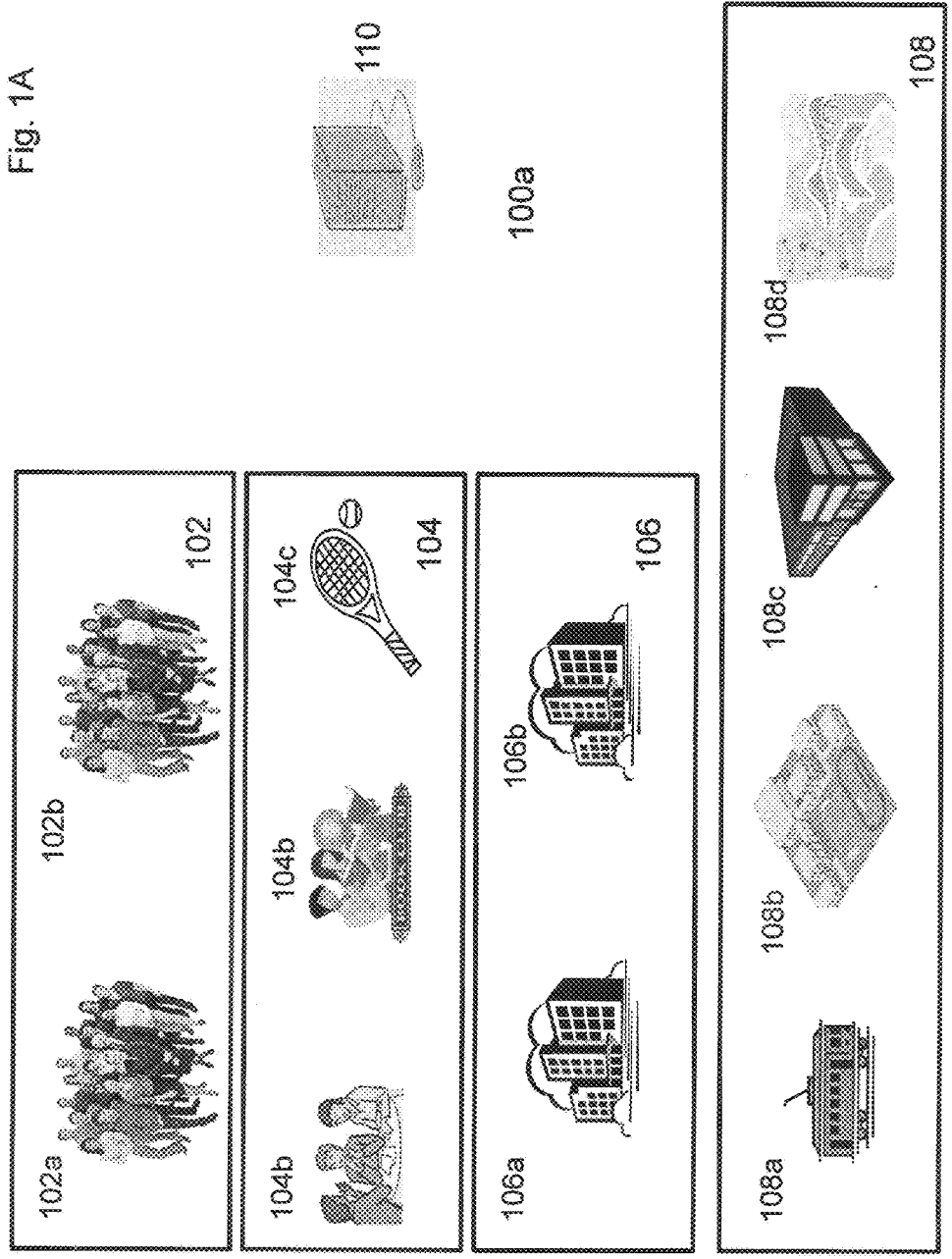

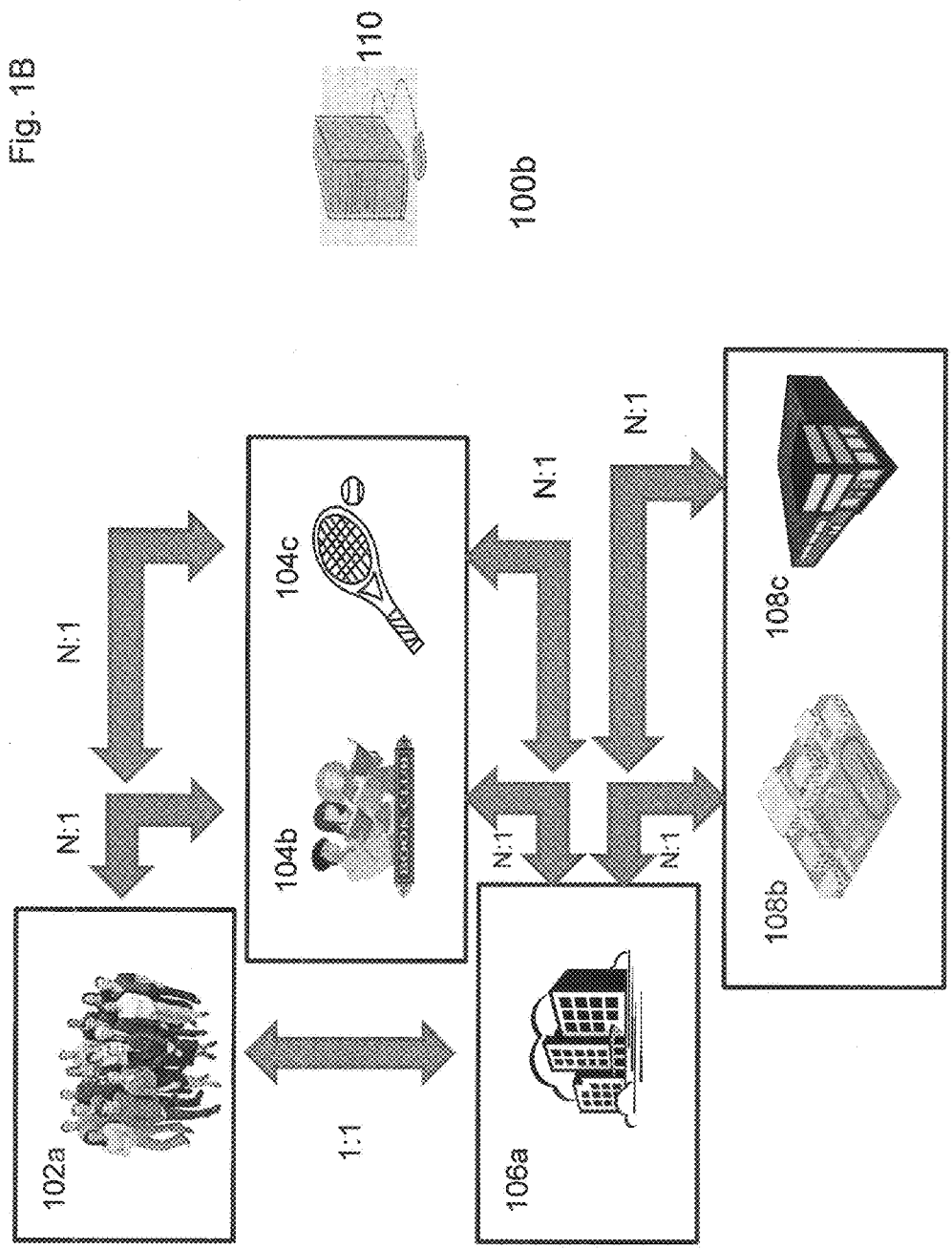

SYSTEM AND METHOD FOR TRACKING AND IDENTIFYING INTERESTS AMONG TENANTS FOR FOSTERING COMMUNITY RELATIONSHIPS

FIELD OF DISCLOSURE

The disclosure is related to a system and method for identifying, managing and linking persons with activities, actions and acts and generating and distributing information, reports and notices related to such activities. In particular, the disclosure provides a system and method for identifying, managing and linking tenants with one or more activities conducted at a residential building to foster relationships among tenants in the building as a community.

BACKGROUND

Databases and social networks exist that track groups for persons having defined common interests. For tenants in an apartment building, social dynamics with the other tenants and administrative issues with the building management and facilities render current meeting facilities, like social networks, incomplete.

There is a need for a system and method which addresses deficiencies in prior art.

SUMMARY OF THE DISCLOSURE

In a first aspect, a method for managing relationships among records in a database of building and tenants is provided. The method comprises: creating and maintaining a first set of records in the database for tenants, each record in the first set of records including fields for a name, contact information, building and interests; creating and maintaining a second set of records in the database for buildings, records in the second set including fields for a building name, address and amenities; creating and maintaining a third set of records in the database for activities, records in the third set including fields for an activity name, organizer, site, participants and activity details; analyzing the database to identify a set of tenant records in the first set of records that match an activity in the third set; and generating and sending notifications using contact information in the set of tenant records relating to the activity.

In the method, the notifications may be email messages containing details of an upcoming event for the activity having email addresses extracted from the database from the contact information in the set of tenant records relating to the activity. Notifications may also be made via a landlord-provided electronic tablet.

The method may further comprise updating the set of tenant records with attendance information following an event time associated with the activity.

The method may further update a calendar application for accounts associated with the set of tenant records with an entry related to the activity.

The method may further comprise: analyzing the database to identify members in the set of tenant records that have achieved participation levels for the activity; and generating and printing certificates for the members in the set having information in the certificates extracted from the records of the members in the set of tenant records.

The method may further comprise: analyzing the set of tenant records that match the activity in the database for a newly associated record that is now associated with the activity; generating and printing a membership card; and sending a notification of the membership using contact information in the newly associated record.

The method may further comprise: analyzing the set of tenant records that match the activity in the database against achievement parameters associated with the activity; identifying records in the set of tenant records that match the activity in the database that match the achievement parameters; generating and printing achievement certificates; and sending notifications using contact information in the set of tenant records relating to the activity.

The method may further comprise updating the records in the set of tenant records that match the achievement parameters with details of the certificates.

The method may further comprise generating in a graphical user interface (GUI) on a display a bulletin or an electronic tablet (perhaps provided by the landlord) providing details of the activity, wherein the display is located in a common area of the site associated with the activity.

The method may further comprise receiving an electronic message from a tenant in the set of tenant records that match the activity relating to the activity containing information about the tenant and the activity; and updating the database to include the information about the tenant for the activity.

The method may further comprise: creating and maintaining a fourth set of records in the database for potential tenants, each record in the first set of records including fields for a name, contact information, building and desired building; analyzing the database to identify a set of potential tenant records in the fourth set of records that match an available unit in the second set; generating and sending credit requests using contact information in the set of potential tenant records to a credit agency; and generating and sending notifications and draft agreements using contact information in the set of potential tenant records relating to the available unit.

In a second aspect, a server for managing relationships among records in a database of building and tenants is provided. The server comprises: a microprocessor; a memory storage device; a first communication link to a database; a second communication link to a network; and a database software module for providing instructions for execution on the microprocessor. The instructions are to: create and maintain a first set of records in the database for tenants, each record in the first set of records including fields for a name, contact information, building and interests; create and maintain a second set of records in the database for buildings, records in the second set including fields for a building name, address and amenities; create and maintain a third set of records in the database for activities, records in the third set including fields for an activity name, organizer, site, participants and activity details; analyze the database to identify a set of tenant records in the first set of records that match an activity in the third set; and generate and send notifications using contact information in the set of tenant records relating to the activity.

In the server, the database software module may provide further instructions for execution on the microprocessor to send the notifications as email messages containing details of an upcoming event for the activity having email addresses extracted from the database from the contact information in the set of tenant records relating to the activity.

In the server, the database software module may provide further instructions for execution on the microprocessor to update the set of tenant records with attendance information following an event time associated with the activity.

In the server, the database software module may provide further instructions for execution on the microprocessor to:

analyze the set of tenant records that match the activity in the database against achievement parameters associated with the activity; identify records in the set of tenant records that match the activity in the database that match the achievement parameters; and generate and print achievement certificates and sending notifications using contact information in the set of tenant records relating to the activity.

In the server, the database software module may provide further instructions for execution on the microprocessor to update the records in the set of tenant records that match the achievement parameters with details of the certificates.

In the server, the database software module may provide further instructions for execution on the microprocessor to generate in a GUI on a display a bulletin providing details of the activity, wherein the display is located in a common area of the site associated with the activity or on an electronic tablet.

In the server, the database software module may provide further instructions for execution on the microprocessor to update a calendar application for accounts associated with the set of tenant records with an entry related to the activity.

In other aspects, various combinations of sets and subsets of the above aspects are provided.

DESCRIPTION OF THE DRAWINGS

Embodiments of the present disclosure will now be described, by way of example only, with reference to the accompanying drawings, in which:

FIG. 1A is schematic diagram of exemplary classes of entities relating to one or more multi-dwelling units that are tracked and managed by a server according to an embodiment;

FIG. 1B is schematic diagram of exemplary classes relating to one multi-dwelling units tracked and managed the server in FIG. 1A;

FIG. 6 is a block diagram of an exemplary activity table in a database as managed by the server of FIGS. 1A and 1B according to an embodiment;

FIG. 7 is a block diagram of an exemplary logistics table in a database as managed by the server of FIGS. 1A and 1B according to an embodiment;

FIG. 8A is a block diagram of a first part of an exemplary volunteer activity table in a database as managed by the server of FIGS. 1A and 1B according to an embodiment;

FIG. 8B is a block diagram of a second part of the volunteer activity table from FIG. 8A;

DETAILED DESCRIPTION OF EMBODIMENTS

Figure 2:
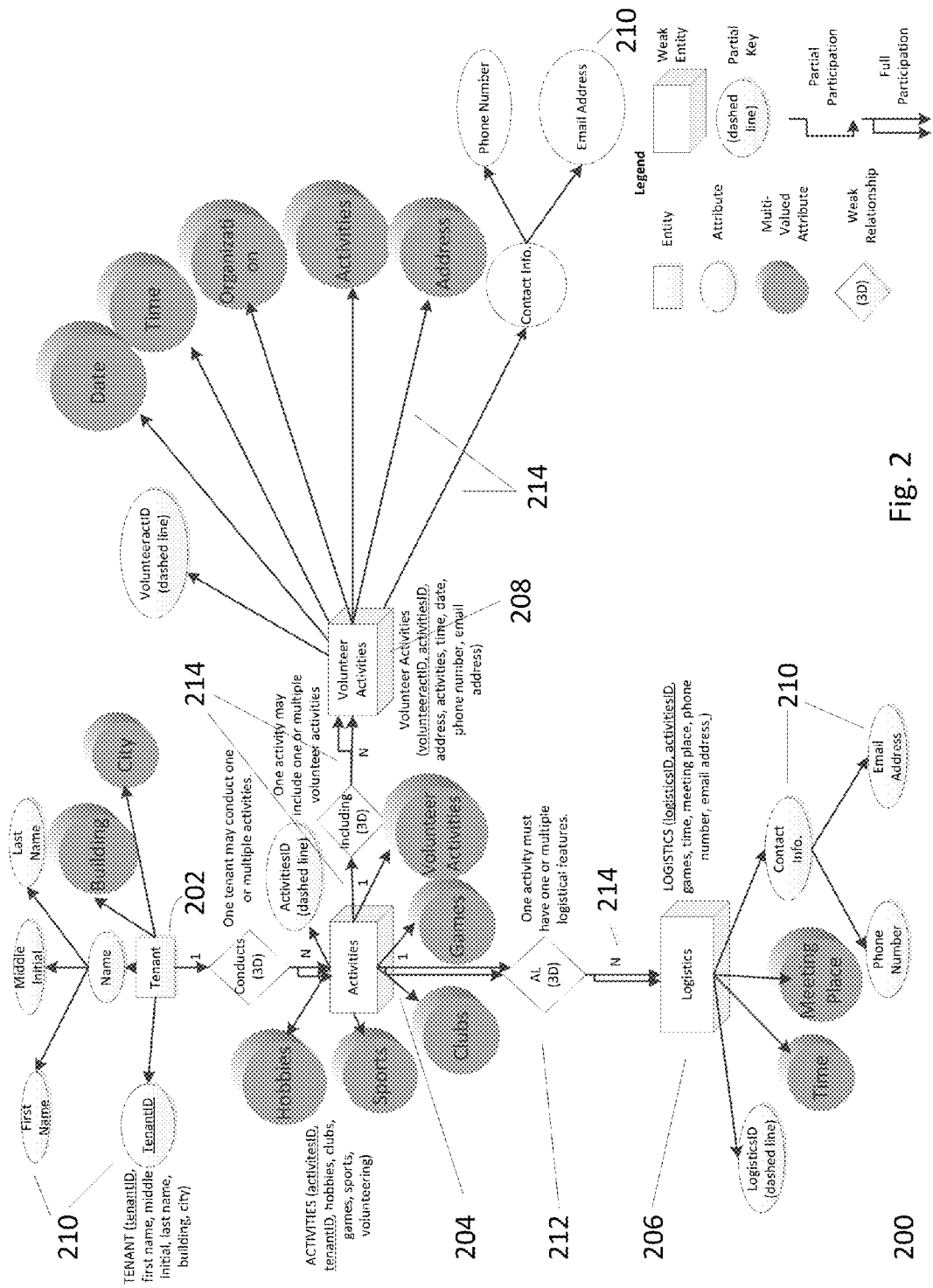
FIG. 2 is an organizational chart of exemplary relationships managed by the server shown in FIGS. 1A and 1B of an embodiment.

The present disclosure is directed to providing systems, methods and devices to enable communities of people, such as tenants and managers for one or more apartment buildings, to create, manage and track activities, clubs, societies, groups, notices, events, vacancies and other activities. A feature of an embodiment implements aspects of a match-making system and facilitates creation of stronger communities in the setting of such communities by bringing people together in a real, physical groups and communities within a multi-unit dwelling.

One aspect of an embodiment provides a database management system for identifying common interests of tenants in one or more multiple-unit dwelling (herein referred to as apartments or dwellings) with activities, clubs, associations, groups, societies, events of clubs, organizations, committees and other groups associated with one or more such dwellings to foster community relationship(s) in the dwellings. An embodiment provides additional features for management of the one or more dwellings.

Referring to FIG. 1A, system 100a shows an exemplary set of groups of entities that have one or more association with one or more other groups in the system. The entities include persons 102, activities 104, buildings 106 and amenities 108. Additional or less entities may be provided in other embodiments. A given entity may be divided into two or more sub-entities. Entities within a group of entities share at least one characteristic that defines the group. For example, members in the group of persons 102 are any set of people, related or unrelated. For the sake of illustration, some exemplary entities in exemplary groups are shown. First, in the group of persons 102, persons 102a are defined as people living at residence(s) that have a common certain postal code and persons 102b are defined as people in a certain age demographic. Members in the group of persons 102 may be any set of people, related or unrelated. Next in the group of activities 104, social dinners 104a, book club meetings 104b and tennis ladder 104c are provided. Next, in the group of buildings, building 106a is a first apartment building operated by a landlord at a first location and building 106b is a second apartment building operated by the landlord at a second location. Finally for the group of amenities 108, subway station 108a, public elementary school 108b, shopping plaza 108c and park 108d are presented. These and other amenities may be associated with a particular building or within a defined proximity (or range of proximities) to a building. As such, an amenity may be associated with one or more buildings and may have differing association "strengths" with several buildings.

Server 110a tracks, manages, links and analyzes the status of members of a group of entities and their relationships with other members of within that group and with other member(s) in other groups of other entities according to an embodiment. Relationships between entities may be one directional or bi-directional. Relationships may be established between one entity and another entity (e.g. one-to-one—1:1), one-to-many (1:N), many-to-one (N:1) and many-to-many (N:M). These relationships follow known relational database constructs and naming conventions. Association strengths may be assigned for such relationships among entities and differing association strengths may be provided for one entity for its associations with other entities.

For an embodiment, server 110a maintains a database to track and manage relationships among the entities in the groups. Analysis of the contents of the database may reveal additional relationships among the entities. In one embodiment, the database is organized as a relational database. One exemplary relational database is provided in Microsoft Access (trade-mark), a commercial software application package. A database system using SQL may also be deployed for an embodiment.

In an exemplary implementation of an embodiment for a tenant-building environment a database is provided that tracks records of tenants, potential tenants, building(s), amenities for the building(s) and activities associated with the building(s). These records are typically stored as tables in the database and relationships among the records are identified through an analysis of the database. Exemplary details on some records are provided.

A first type of record is a building record. The contents of a building record include various functional and operational details about a particular building. Table A below is an exemplary record for a building:

TABLE A

| Field | Value |
| --- | --- |
| Name | Boardwalk Apartments |
| Address | 1 Boardwalk Street |
|  | Calgary, AB |
| BuildingID | 001 |
| Owner | Building Corp. |
| Superintendent | Jim Smith |
| Features | Pool, 3 Tennis courts, |
|  | underground parking 2 levels |
| Bachelor/Vacancies | 20 units/1 |
| 1 Bedroom/Vacancies | 25 units/2 |
| 2 Bedroom/Vacancies | 30 units/2 |
| 3 Bedroom/Vacancies | 25 units/1 |
| Other/Vacancies | 10 units/1 |
| Parking Spots/Vacancies | 100/10 |
| Update date | Dec. 01, 2012 |

More or less fields can be provided to describe a building. Fields may or may not be populated for a given building.

A second type of record is a tenant record. The contents of the tenant record include various biographical information about a particular tenant. Table B below is an exemplary record for a tenant:

TABLE B

| Field | Value |
| --- | --- |
| Last Name | Jones |
| First Name | David |
| TenantID | 0005 |
| Email | djones@email.com |
| Phone No. | 403-555-1212 |
| Address | Unit 15- |
|  | 1 Boardwalk Street |
|  | Calgary, AB |
| Associated residents | Mary (wife) |
|  | Peter (son) |
| Pets | none |
| Tenant since | 2008 |
| Special Needs | Sight dog |
| Interests | Tennis |
| . . . | . . . |
| Miscellaneous |  |
| Income | $60K |
| Rental Payment History | Good |
| Update date | Dec. 01, 2012 |
| . . . | . . . |

More or less fields can be provided to describe a tenant. Fields may or may not be populated for a given tenant. For one embodiment both the tenant and the administrator may review and make changes to values in the tenant's record. However, some administrative fields may not be accessed by the tenant and may not be shown or amended by the tenant. Exemplary administrative fields, where access is restricted, are shown beneath the dashed line in Table B.

A logistics record is a fourth type of record and for an embodiment a logistics record is associated with a tenant record. The contents of a logistics record provide information and links to one or more activities that the associated tenant has joined. Table C below is an exemplary record for logistics for a tenant:

TABLE C

| Field | Value |
| --- | --- |
| Last Name | Jones |
| First Name | David |
| TenantID | 0005 |
| Activities | Tennis |
| Availabilities | Tuesdays |
| Notification Preference | Email, telephone, |
|  | building mail |
| Update date | Dec. 01, 2012 |
| . . . | . . . |

A fourth type of record is an activity record. The contents of an activity record identify various features about an activity that is associated with a building. Table D below is an exemplary record for an activity:

TABLE D

| Field | Value |
| --- | --- |
| Activity | Tennis club |
| ActivityID | 0003 |
| Tenant | Jones, David |
| Site for Activity | Boardwalk Apartments, |
|  | Tennis Court A |
| Available | Every Monday 6-8 PM |
|  | April-October |
| Email Notifications to members | Yes |
| Text Notifications to members | No |
| Award Designations | Attendance at 5 meetings |
|  | Club champion |
| Update date | Sep. 30, 2011 |
| . . . | . . . |

More or less fields can be provided to describe parameters that the tenant may have for an activity.

A fifth type of record is a volunteer record. A volunteer record is used to track volunteer activities associated with a building. A volunteer record identifies its associated activity, its organizer(s), its location(s), its meeting time(s) and other parameters. A volunteer records may be associated with one or more activities (of tenants). The contents of a volunteer record identify various features about a volunteer position that is associated with an activity. Table E below is an exemplary record for a volunteer:

TABLE E

| Field | Value |
| --- | --- |
| Activity | Tennis club |
| Lead Organizer | Jones, David |

TABLE E-continued

| Field | Value |
|---|---|
| VolunteerID | 0017 |
| Meetings | Every Mon., Wed. and Fri. from 6-8 PM |
| Awards | Club Champion, perfect attendance |
| Duties | Book Tennis courts, weekly, update tennis ladder |
| Update date | Dec. 01, 2012 |
| ... | ... |

More or less fields can be provided to describe activities of a volunteer activity.

A sixth type of record is an amenity record. The contents of an amenity record identify various amenities, features and services that are associated with a building. Amenities may include publicly accessible services such as transit stations, shopping malls, parks, schools, public swimming pools, etc. Amenities may include facilities located within the building (e.g. pools, squash courts, exercise rooms, etc.). Table F, below is an exemplary record for an amenity:

TABLE F

| Field | Value |
|---|---|
| Amenity | Subway Station - Main |
| AmenityID | 0007 |
| Address | 100 Main Street |
| Associated with | Boardwalk Apartments Main Street Apartments |
| Miscellaneous | Open 24/7 |
| ... | ... |

A seventh type of record is a potential tenant record. A potential tenant record tracks items about applicants whom have submitted residential applications to a building, but have not been provided with a residence in the building. The reasons can be for lack of an appropriate opening, a bad credit rating or other reason(s). Table G below is an exemplary record for a potential tenant:

TABLE G

| Field | Value |
|---|---|
| Last Name | Smith |
| First Name | Peter |
| ApplicantID | 00101 |
| Email | psmith@email.com |
| Phone No. | 403-555-2121 |
| Current Address | 10 Main Street, Calgary AB |
| Desired Building | 1 Boardwalk Street Calgary, AB/ 2 bedroom |
| Associated residents | Jane (wife) Helen (daughter) |
| Pets | None |
| Applicant since | 2008 |
| Special needs | Wheelchair access |
| Interests | Tennis |
| Miscellaneous | |
| Income | $60K |
| Credit Rating | Fair |
| Notify when unit becomes available? | Yes |
| ... | ... |

It will be seen that a record for a potential resident shares many fields with a record for an actual resident. For one embodiment both the potential tenant and the administrator may review and make changes to values in the tenant's record. However, some administrative fields may not be accessed by the potential tenant and may not be shown or amended by the potential tenant. Exemplary administrative fields are shown beneath the dashed line in Table G.

An eighth type of record is a building service record. A building service record tracks items about a building that its residents may need to be advised of (e.g. monthly meetings, announcements, service advisories, repairs, etc. Table H below is an exemplary record for a building service record:

TABLE H

| Field | Value |
|---|---|
| Activity | Underground garage cleaning - Level 1 |
| BuildingID | 0003 |
| Administrator | Jim Smith |
| Activity | Clean Level 1 parking spots |
| Date | Monday Feb. 1 |
| Email Notifications to tenants | Yes |
| Update date | Sep. 30, 2011 |
| ... | ... |

It will be appreciated that other records, including records based on combinations of aspects of the above noted records may be used.

Additional entities can be provided in other embodiments. Different entities can be used in other database systems. For example, in a different embodiment, an activity record can be modified and used to reflect activities that are available to a site (akin to a volunteer activity record per Table D) and a volunteer activity record may be modified and used to reflect specific activities managed by an organizer of an activity (supplementing the above-noted volunteer activity record per Table D). For examples presented herein, the activity and volunteer activity records provide features and functions as described in the Tables above.

An embodiment tracks data related to the entities in a database and permits reports to be generated based on an analysis of the database records. Various users may access the database. A user may be a tenant, an administrator of an activity, an administrator of a building, a potential tenant, a credit agency or another person. To populate specific records for entities an embodiment generates a series of graphical user interfaces (GUIs) on a display for a terminal accessed by a user. Exemplary terminals include computer-based devices, such as laptop computers, desktop computers, smart phones, tablet devices and simple terminals. The terminal accesses the database and the database management system. The GUI permits a particular user with appropriate access rights to update, view and get information from the database using the database management system to generate queries to the database and post results to the GUI. Separate accounts may be associated with one or more of the tenants, organizers and administrators so that different levels of access (e.g. read only certain records, read/write access) can be provided to different accounts.

For example, using a data entry GUI provided by an embodiment, a tenant may access parts of his record and enter/update contact information in his corresponding tenant record. Some fields may be associated with a tenant's record may not be accessible by the tenant. For example, the record may also include current and past rental rates, payment history, credit reports, complaint reports and other administrative information or confidential information tracked by the landlord.

Through the data entry GUI, a tenant may provide input to the database details of hobbies, sports, clubs, games, volunteer activities, needs, accessibility issues and other information, as tracked in his activity table record. Upon completion of his activity record, the system links that tenant's activity record to that tenant's tenant record through the TenantID foreign key.

Through the data entry GUI, an administrator of a club may access the club's account and create/modify its volunteer activity record to provide details regarding its organization, needs, meeting times, locations and other administrative information. For example, the administrator may provide data for a date, time, organizer contact, activities, address, phone number and email address relating to the activity. The database generates a unique VolunteeractID for the club's entry, which is linked to the activity table by the ActivityID.

Through the data entry GUI, interested applicants (i.e. potential tenants) who do not currently reside in a building may also utilize the system. A potential tenant can have a record created by him or the administrator that includes his contact information and other details similar to a resident tenant's record. However, additional information such as references, income, desired number of rooms, desired number of washrooms, other facility requirements and amenity requests may also be entered and tracked. The system may also track current vacancies, wait lists and other occupancy-related and facility-related data for the building (and other buildings) and periodically run a query to determine if any current vacancy matches a request for a residence from a potential tenant. The matching criteria may be that the available unit matches the exact parameters for a desired unit and any associate amenities (e.g. parking, south facing windows, storage facilities, etc.). Alternatively, the system may provide alternatives that match or come close to matching one or more of the parameters.

Now, further detail is provided on linkages and associations defined and generated among records of the entities in the database for an embodiment. An embodiment provides facilities to establish, maintain and change relationships among the entities. Specific relationships allow an embodiment to analyze and identify associations among entities, action items for a particular entity and to identify and provide other information and details.

For an embodiment, a database notation is employed to assist in identifying properties of a record. In the notation, the primary key of an entity is underlined. Following this notation, the entities may be described as follows:

a tenant entity may be described as tenant (TenantID, First name, Middle initial, Last name, Building, Address, City, etc.);
an activity entity may be described as activity (ActivityID, TenantID, Hobbies, Sports, Clubs, Games, Volunteer Activity, etc.);
a logistics entity may be described by logistics (LogisticsID, ActivityID, Time, Meeting Place, Phone Number, Email Address, etc.); and
a volunteer Activity entity may be described as volunteer activity (VolunteerActID, ActivityID, Date, Time, Organization, Activity, Address, Phone Number, Email Address, etc.).

As noted earlier, an entity may be assigned with an association strength for its relationship with another entity. One configuration provides "strong" and "weak" associations. Other different strength may be provided. In the embodiment, the activity entity is defined as a weak type as it is dependent on a strong entity for its existence, which in this case is the tenant entity. As such, for an activity entity, two attributes are underlined—the activity partial key and the tenant owner key. As such, the primary key of the activity entity is a concatenated key, per database constructs. Similarly, for an embodiment, the logistics entity is defined as a weak entity because it is dependent on the activity entity. For the present embodiment, the volunteer activity entity is also a defined as a weak entity, as it is dependent on the activity entity.

Since weak entities typically require an attribute from a strong entity to create a primary key, no single one of their attributes is unique. The primary key for weak entities typically consists of two (or more) attributes, so any attribute by itself is designated as a partial key. For example, VolunteerActID is a partial key of the volunteer activity entity.

For the present example, the primary keys for the entities are selected as: TenantID, LogisticsID, ActivityID and VolunteeractID. The foreign keys are: TenantID, LogisticsID and ActivityID. Other embodiments can select other primary and foreign keys. As the foreign keys are fields in two tables each, they make the relationships feasible. It is noted that a foreign key follows referential integrity, where each value in a foreign key field exists as a value in the primary key field of the table that is being referred to. In many instances, for 1:N and N:1 relationships, the key field from the class at the one end is added as a foreign key in the class at the "N" (i.e. the "many") end. In this configuration, the foreign key in the activity table is TenantID, which is identified from the tenant entity.

For an entity, once its relationships are defined, data types for its fields may be set. A field generally can be defined as text, number, date/time, currency or miscellaneous. An field automatic fill feature for a field identifier may be implemented, depending on the facilities provided by the underlying database software.

Now further details of an exemplary embodiment in operation are provided. Referring to FIG. 1B, system 100*b* is a system of groups from FIG. 1A showing an exemplary organization of entities that can be tracked by an embodiment. Tenants in group 102*a* are defined for this example, as people living at building 106*a*. As such, tenants collectively have an N:1 relationship with a building 106*a*. One or more persons in group 102*a* may belong to one or more activities 104, such as book club meetings 104*b* and/or tennis ladder 104*c*. As such, each person may have multiple N:1 relationships with none, one or more activities 104. It is an N:1 relationship for the each person to the activities as an activity may be associated with several persons. Building 106*a* may be a host to one or more activities 104. As such, building 106*a* may have multiple N:1 relationships with none, one or more activities 104. It is an N:1 relationship for the building to the activity as an activity may be associated with several buildings. Building 106*a* may be associated with one or more amenities 108, by proximity or otherwise, such as school 108*b* and shopping mall 108*c*. As such, building 106*a* may have multiple N:1 relationships with none, one or more amenities 108. It is an N:1 relationship for the building to the amenities as an amenity may be associated with several buildings (e.g. the amenity may be close to several buildings). Relationships between entities as described above can be varied to depending on specific characteristics of one or both of the entities. As such, a relationship between two entities may be any of 1:1, N:1, 1:N or N:M.

Figure 3:
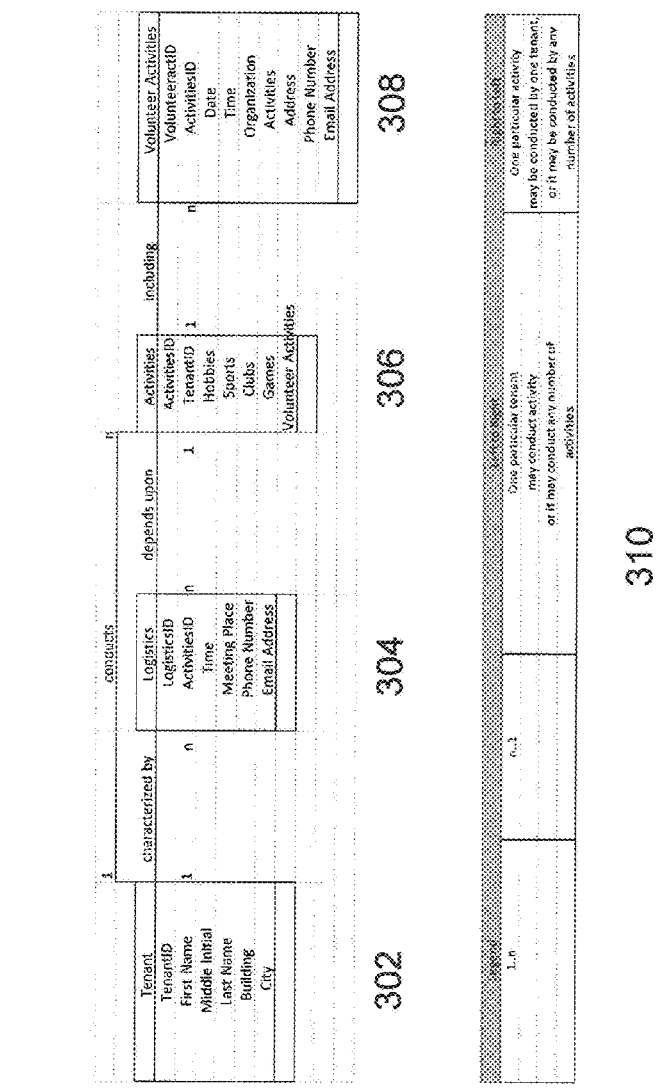
FIG. 3 is a block diagram of exemplary relationships defined among some entities as managed by the server of FIGS. 1A and 1B of an embodiment.
Figure 4:
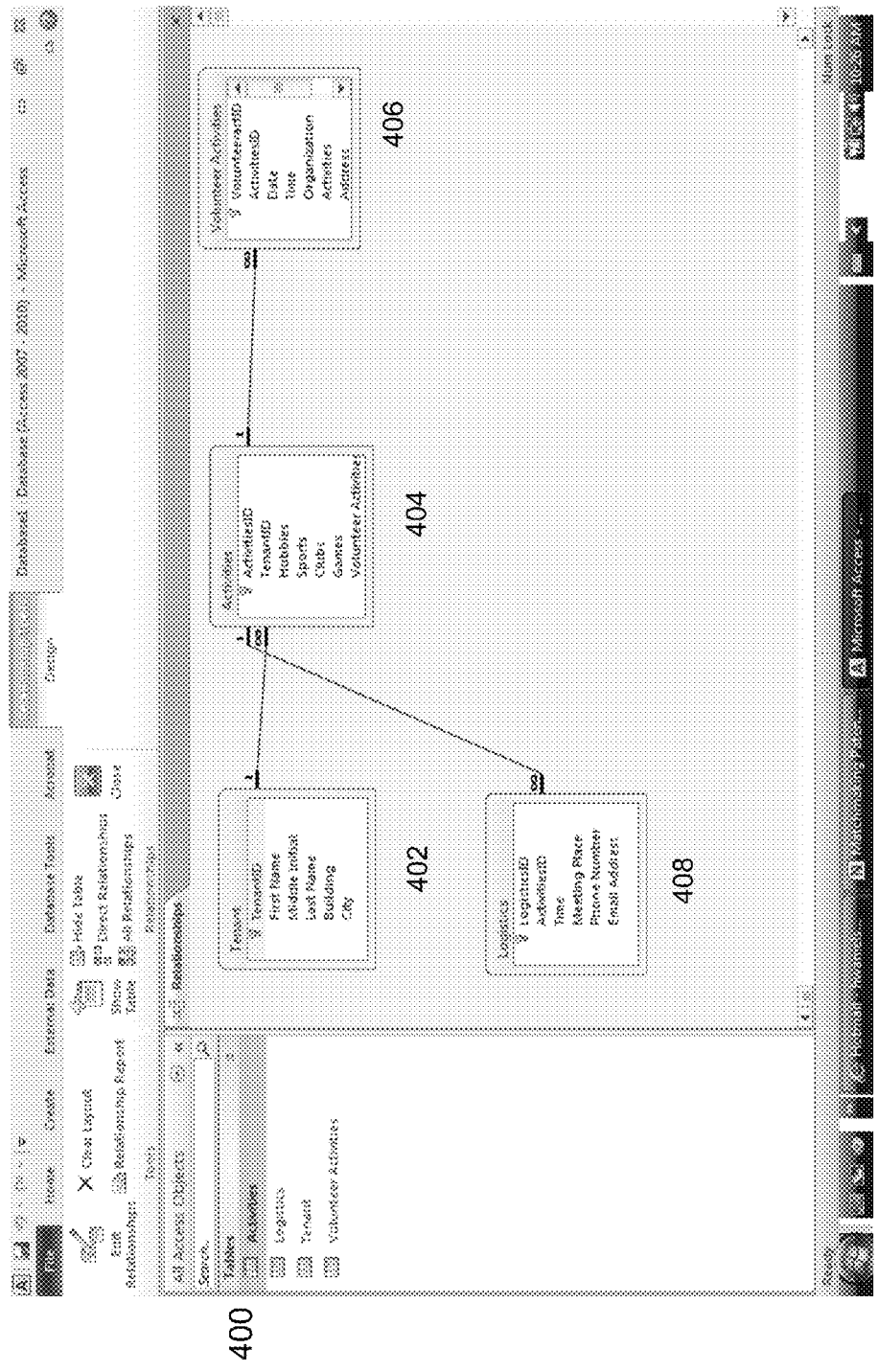
FIG. 4 is an entity-relationship diagram showing relationships among the entities and their attributes for some of the entities as managed by the server of FIGS. 1A and 1B of an embodiment.

With high level details of exemplary relationships among entities described for an embodiment, FIGS. 2-4 show additional details of aspects of a database managed by an embodiment, showing an exemplary interaction of selected records from selected tables described above. Layout 200 shows an organization of entities for a database that tracks four entities, tenants 202, activities 204, logistics 206 and volunteer activities 208, each entity having a set of attributes 210. Entities are linked by relationships 212. For the present example, a relationship between two entities is either a 1:N or N:1 relationship. Layout 200 shows that one tenant may be associated with one or many activities, while one activity may be associated with one or many logistical possibilities. Further, one activity may be associated with one or many volunteer activities.

In particular, layout 200 showing interactions and relationships between the entities and their attributes. Layout 200 shows tenant 202 which is linkable to activity 204, which is linkable both to logistics 206 and to volunteer activity 208. Links between two entities are shown via relationship connectors 212.

Properties of an entity are illustrated by its geometric shape. In FIG. 2, weak entities and relationships are shown in double-boxes. Relationships between entities are shown in diamonds. Attributes are symbolized by circles. Arrows 214 link two entities together and show a level of participation between the source entity (at the base of arrow 214) and the destination entity (at the head of arrow 214). An arrow also indicates any participation constraint existing between two entities that it connects. A double line for the arrow indicates full participation between the entities and a single line for the arrow indicates partial participation. Multi-valued attributes are shown in double concentric circles or ovals.

FIGS. 3 and 4 show exemplary relationships provided among Tenants, Logistics, Activities and Volunteer Activities. In FIG. 3, tables 302, 304, 306 and 308 contain fields for data for tables relating to a tenant, a logistic, an activity and a volunteer activity, respectively. The tables are shown to be linked by characteristics, dependencies and inclusions as shown. Other relationship can be established (e.g. table 310 shown the relationship links amongst the entities (as N:1 and 1:N relationships noted earlier).

In FIG. 4 diagrammatic relationships provided among tenants, logistics, activities and volunteer activities are shown in graph 400. Therein records for tenants 402, Activities 404, volunteer activities 406 and logistics 408 are shown, representing an additional view of relationships of entities shown in FIGS. 2 and 3.

As noted earlier, data types for fields of a record are provided. While some values for some fields are populated by external data (e.g. as provided through an input data entered to a GUI or imported from an external source to system 110b, other data may be populated by the system. One embodiment designates that the primary key for each table is defined as an autonumber data type (when a Microsoft Access database or an SQL database is used). In one embodiment the software automatically populates the key field with a unique, sequential number for each entry, where each new record is automatically enumerated with a unique identification number in the primary key. The foreign key in one embodiment may be designated as a number type. This designation is suitable since the foreign key creates the relationship and its value is dependent upon the primary key of the entity that is on the one side of the 1:N relationship. Once the relationships are created, the foreign key may be typed as a number. One embodiment designates the remaining fields as text or a date.

In an embodiment, data redundancy is reduced by creating the relationships, so that when a field of a record is changed, the change is reflected in a table with the same attribute. An administrator may implement changes to the attribute, such as deleting or amending characteristics of an activity or social function.

An embodiment also provides database normalization by organizing the fields and tables of the database in an arrangement that attempts to minimize redundancy and dependency among the fields. One form of normalization applied to an embodiment divides large tables into smaller tables that have reduced redundant entries in order to isolate data so that additions, deletions and modifications of a field are provided once in one table with the results propagated through the rest of the database via the relationships.

For an embodiment, normalization is provided by analyzing functional dependencies of entities tracked in the database. For the present example, the TenantID field determines tenant's first name, middle initial, last name, building and city. The ActivityID field and the TenantID field determine a tenant's hobbies, sports, clubs, games, volunteer activities and any other interests that are deemed worthy to be tracked by an embodiment. The LogisticsID field and the ActivityID field determine the time, meeting place, phone number and email address fields. Lastly, the VolunteerID and ActivityID fields determine the date, time, organization, activities, address, phone number and email address fields. As such, for one system, the key fields functionally determine all the other fields in the table.

Now with structural and design features of a database system as provided by server 110b disclosed, further features of an embodiment are described through an exemplary database and server 110b. Referring to FIG. 1B, server 110b is managing a database. In one embodiment, ad administrator in management office for the building, such as a landlord or his proxy, has supervisory controls for the database.

FIGS. 5-7, 8A and 8B are snapshots of exemplary entries in the database for a dataset of ten tenants for an apartment building are provided. The views of FIGS. 5-8A and 8B provide GUIs for allowing text and data to be input into the system.

Figure 5:
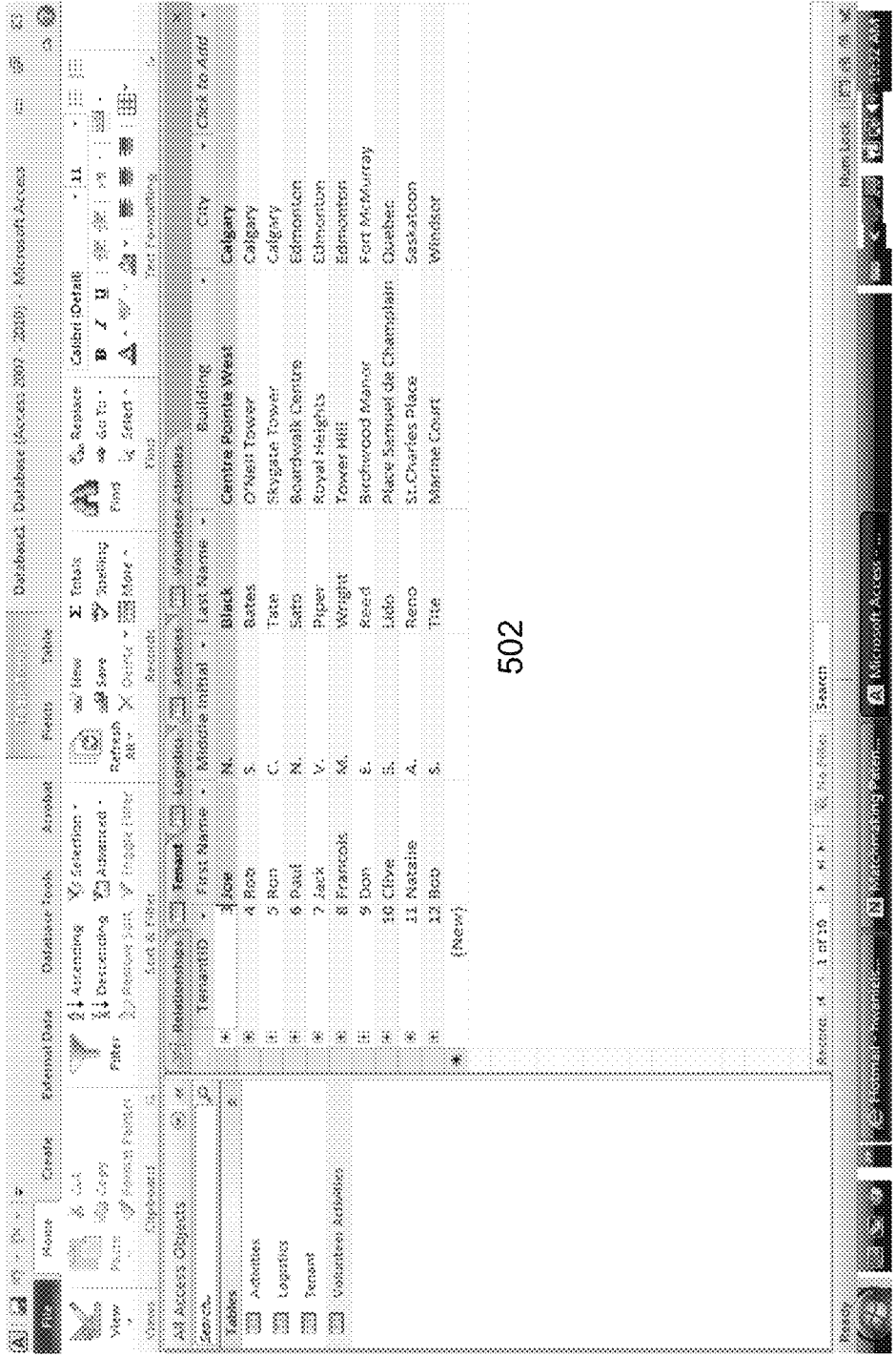
FIG. 5 is a block diagram of an exemplary tenant table in a database as managed by the server of FIGS. 1A and 1B according to an embodiment.

FIG. 5 shows tenant table 500 showing 10 tenant records in columns 502 for exemplary tenants at several building in several cities. Once a tenant starts to type his first name into table 500, then system 110b may generate a unique TenantID for the user's record. The tenant then may continue to enter additional contact and historical data across the row for his record.

Figure 6:
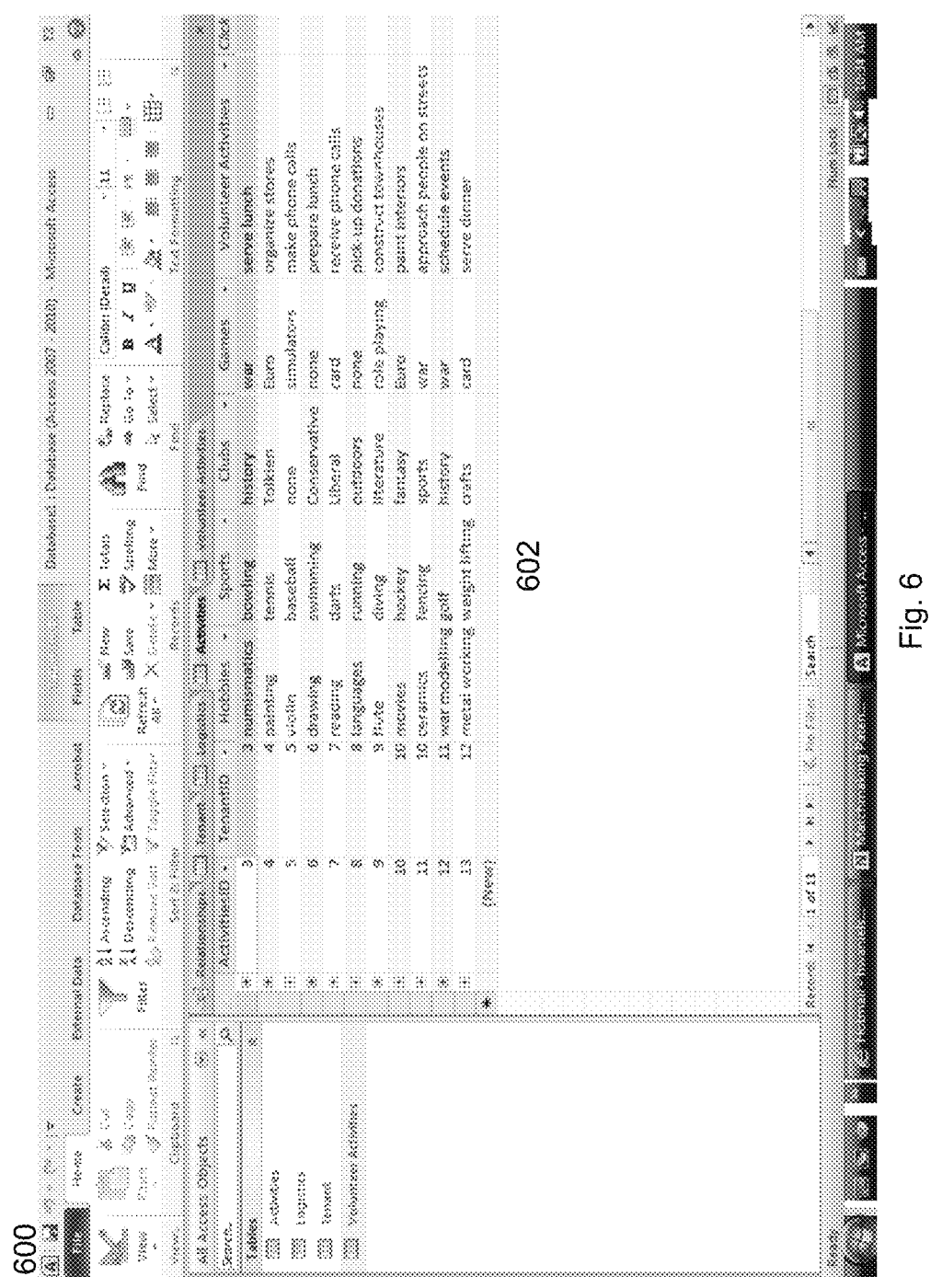

FIG. 6 shows activity table 600 showing 10 activity records for activities in columns 602 that are managed by the system. In an example, when data for a Tenant table (FIG. 5) is entered, data for activity table 600 may be completed. In table 600, an indication is provided that activity table 600 includes a foreign key, indicating a link to tenant table 500. Since it is a foreign key, in order to complete the row for the given entry, the TenantID allotted to the related tenant in tenant table 500 needs to be provided in the corresponding cell in table 600 for that tenant record to complete and link the activity record to the tenant record in table 500. Once the data in entered, the system may generate a unique ActivityID for the user record. After the proper TenantID is provided, data for the rest of the tenant record may be provided. Data for some fields may be provided from other (automated) sources (e.g. from cross references from the building administration records).

Figure 7:
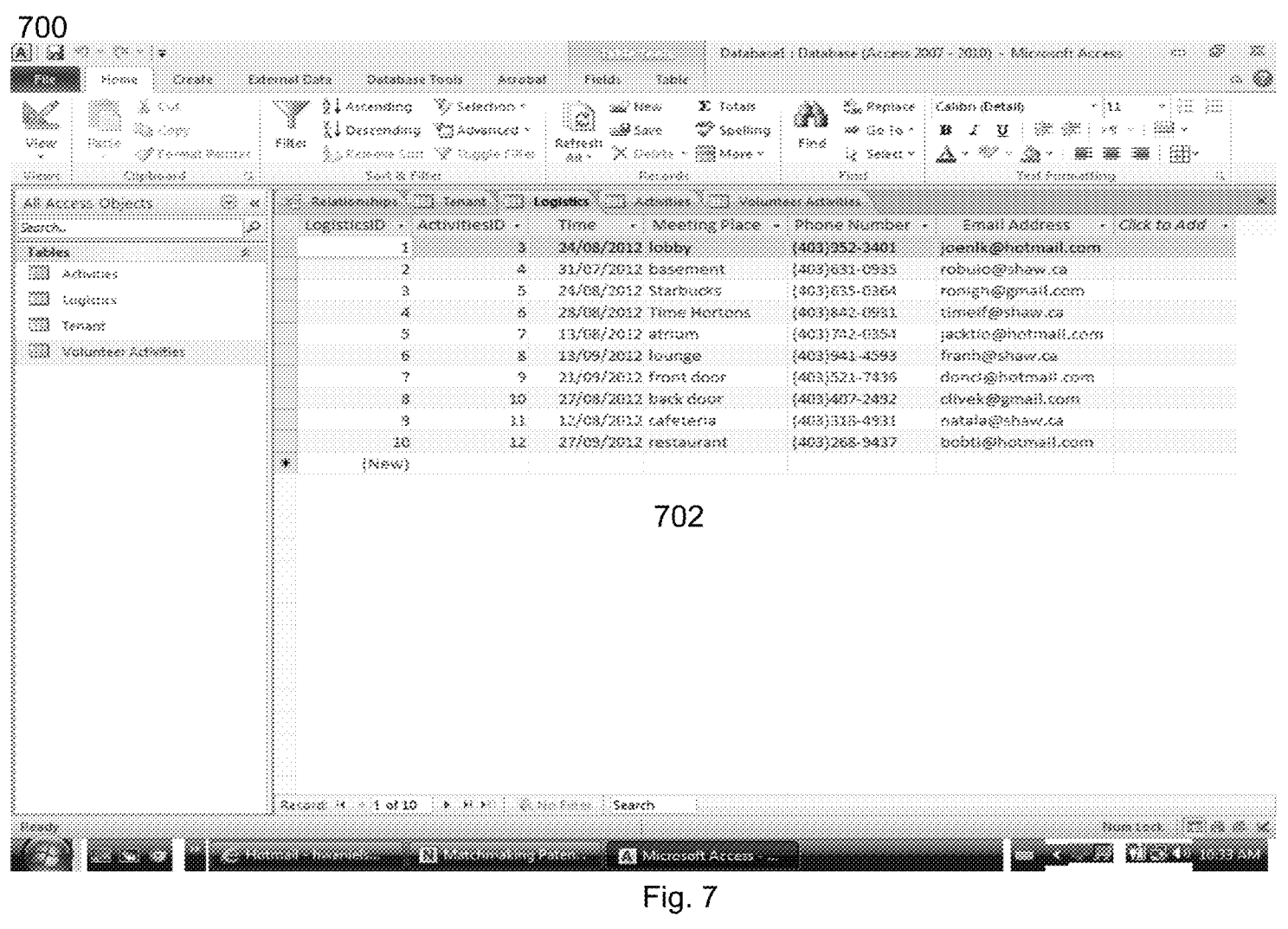

FIG. 7 shows logistics table 700 showing 10 logistics records for exemplary logistics in columns 702 for activities managed by the system. After data is provided to activity table 600, data may be provided to complete logistics table 700, where data relating to a tenant's availability, restrictions and qualifications on participating in the listed activities may be entered or provided. Logistics table 700 shows a various fields that may be completed or may need to be completed. In table 700, an indication is provided that activity table 600 includes a foreign key, indicating a link to activity table 600. As such an ActivityID needs to be provided to complete and link the logistics record to the activity record in table 600. Additional data may be requested to be entered, such as the date of entry and contact information. Data for some fields may be provided from other (automated) sources.

Figure 8A:
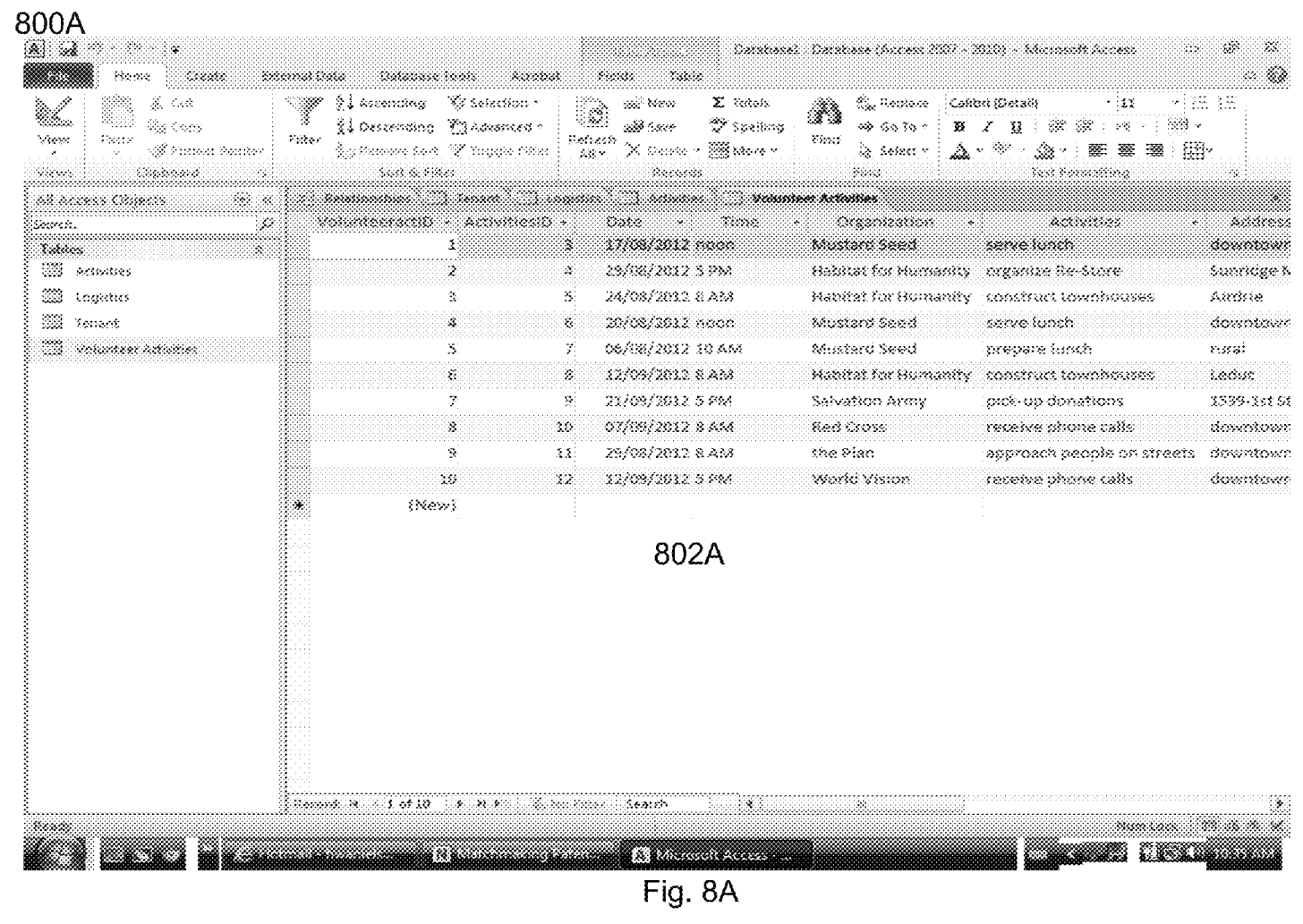
Figure 8B:
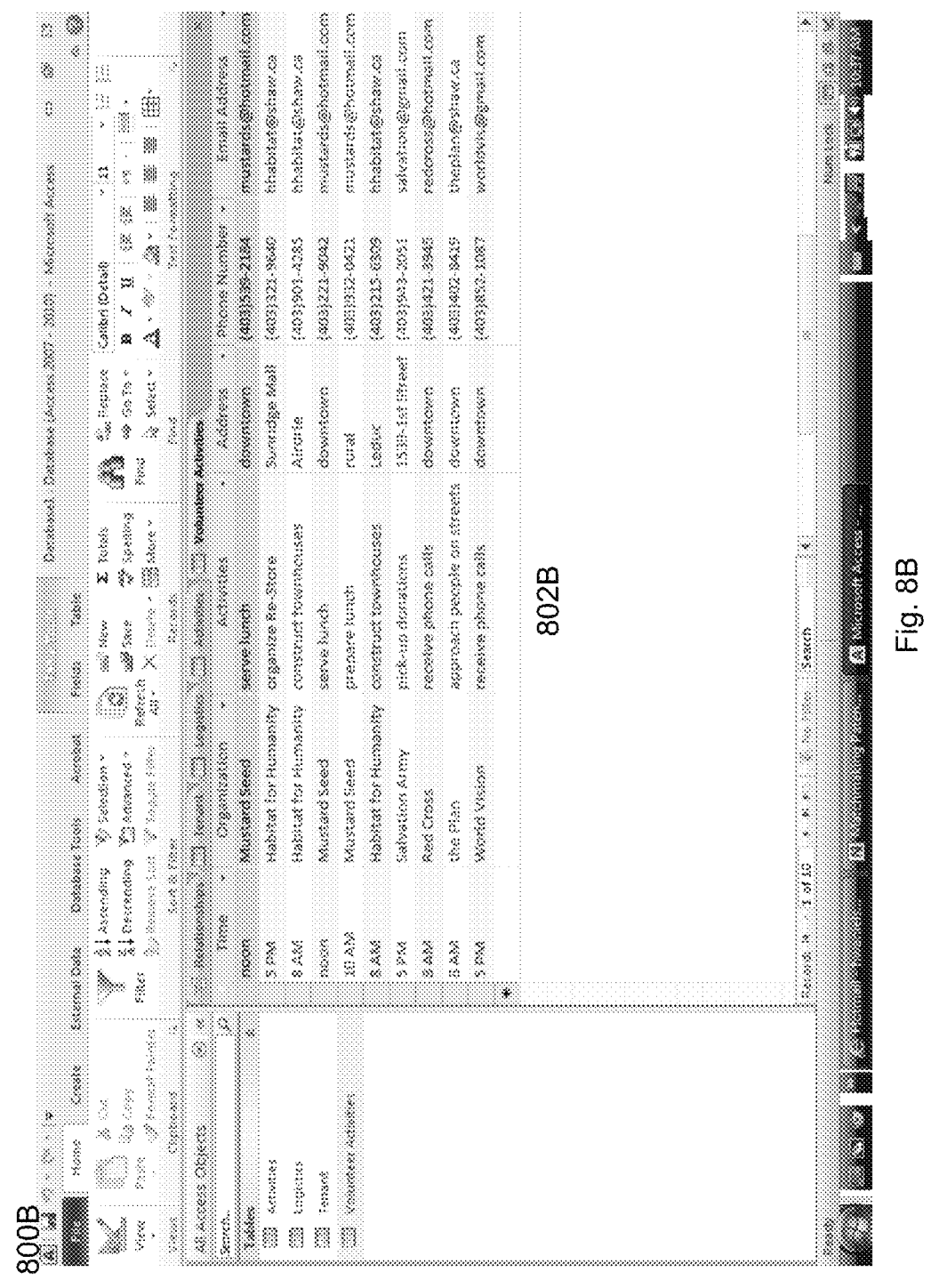

FIGS. 8A and 8B show partial view table 800A and 800B (collectively provided as a single table 800) showing 10 volunteer activities records for exemplary volunteer activities for activities in columns 802A managed by the system. In one embodiment, tables 800A and 800B are accessed by administrators of volunteer organization for the related volunteer activities. Table 800A shows a first portion of a record of volunteer table 800. Table 800A provides a GUI for entry of data and information regarding its services, opportunities for volunteers, needs, meetings, awards, membership and other organizational information. In order to link table 800 to activity table 600, a foreign key allotted to a related activity in activity table 600 must be provided to table 800. For one embodiment, as the present volunteer activity will be linked to an activity noted by the ActivityID, the entry in volunteer activity table 800 will provide information for opportunities that are compatible with a tenant. This arrangement assists in reducing superfluous records. Once the ActivityID information is provided, then system 100b generates a unique VolunteeractID for the record. Data relating to remaining fields in the record may be provided by entry by an administrator or from other (automated) sources. Filling in the fields should be straight forward and this is facilitated by the appearance of a calendar, which the user encounters when he gets to the Date field. An embodiment may create, access and modify data for calendar entries associated with events for activities tracked by an embodiment.

Data for the tables 500-800 noted above may be provided in part through data entered by a user at a terminal accessing the system and in part through automated data queries and responses by the system to additional databases (not shown).

Now, further details are provided on some database analysis algorithms as provided by an embodiment.

Figure 9:
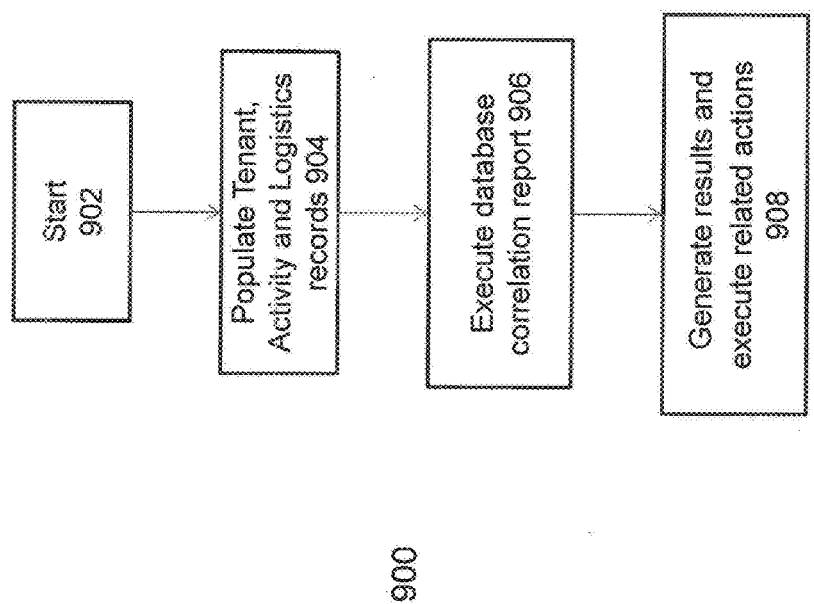
FIG. 9 is a flow chart of a search process operating on the server of FIGS. 1A and 1B according to an embodiment.
Figure 10:
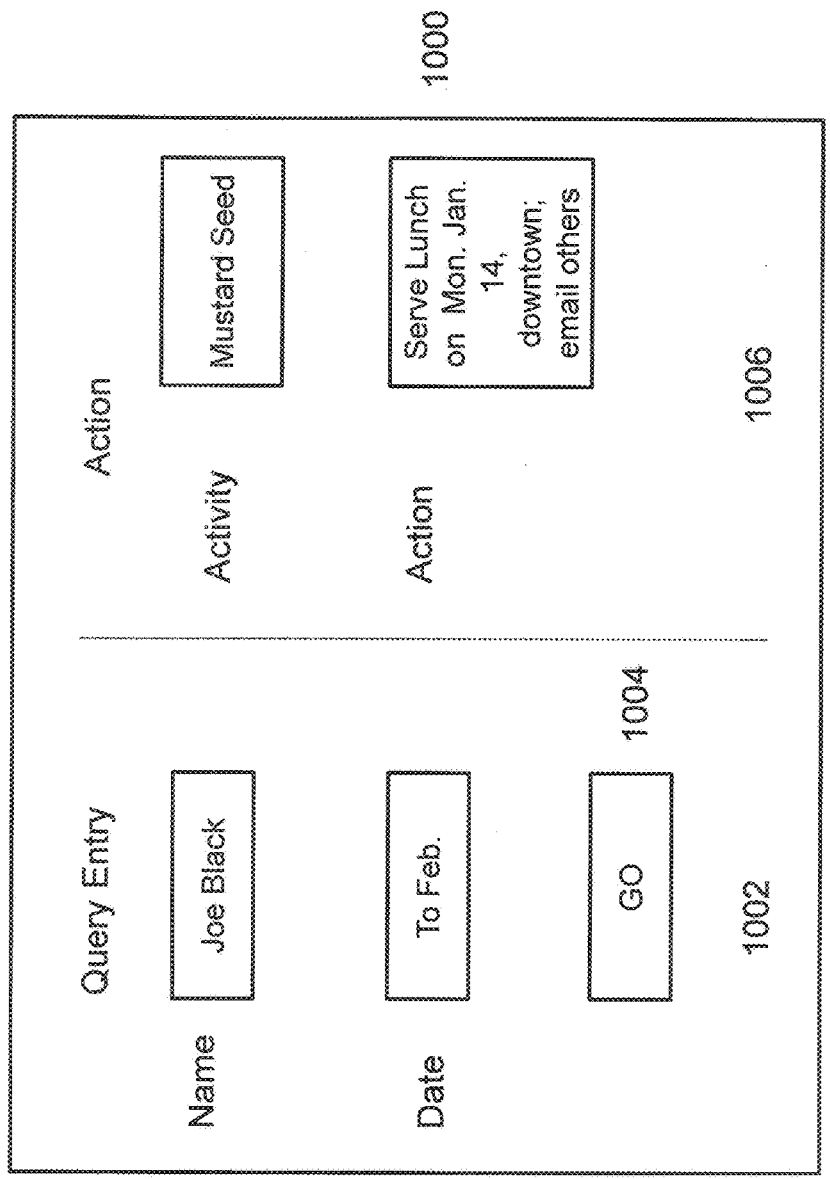
FIG. 10 is a schematic diagram of an output of a graphical user interface (GUI) generated on a display of a computer accessing a database managed by the server of FIGS. 1A and 1B according to an embodiment.

Referring to FIGS. 9 and 10, further details are provided on exemplary algorithms as provided by an embodiment. As previously indicated an exemplary embodiment provided a relational database that is managed, maintained and accessed using Microsoft Access (trade-mark) or other SQL database systems. FIG. 9 shows algorithm 900 outlining basic processes in updating one or more records in a database and then generating reports using the database. Process 900 begins at start process 902. Next at process 904, data relating to various records and table (such as those described for FIGS. 5-7 and 8A and 8B) is entered or populated to the database. Next at process 906, correlations among the records and inquiries are generated.

Finally at process 908 a report is generated and actions are conducted based on the results. The results identify matches among activities and users and generate tables of results, which can be accessed, formatted and presented in various GUIs on terminals. The report can provide visual outputs of when activities are being provided. Also, the GUIs may provide an interface (such as a radio button) to allow a viewer of a GUI to initiate some type of action or act related to the activity. Actions can include generation and sending of electronic notices (e.g. emails, text messages, pre-recorded voice mail messages) to selected recipients at specific times when one or more conditions related to the results is triggered. For example, for potential tenants that are newly matched to a newly available unit using system 110b, an email may be sent to the applicant, an icon may be generated in a GUI on an electronic tablet or web page GUI interface, a credit score request relating to the applicant may be generated and sent to a credit agency and a customized residential tenancy agreement may be created from a template using data relating to the applicant and the agreement may be printed and an electronic version may be sent to the applicant via email. Actions by the recipients (e.g. confirmation of attendance at a meeting or offers to take responsibility for a duty for a meeting (e.g. setup room, take minutes, etc.). The GUI may provide a pre-populated list of tasks that still need to be assigned to person and/or may provide a text box allowing a user to provide a description of an offered service for the meeting. Details on the prepopulated task and other administrative features are stored in the database. For example, for a volunteer activity, when a related event is about to take place, a notification (such as an email, text message or voice mail message) may be generated and sent to a terminal/telephone/email account associated with the identified recipient by the system. The recipients may provide responses that include any services offered by the recipients. For volunteer clubs, attendance may be tracked by the system in order to allow rewards and recognitions to be provided to individuals when certain achievements are reached. Updates for data tracked for activities may be manually entered through an update GUI or may be incrementally automatically updated from emails and messages received by the system from participants. The database may track specific events that are worthy of recognition and any required activities to obtain the recognition (e.g. attendance at all meetings). The system may track a volunteer's progress towards such recognitions, and when the required threshold(s) are met, a custom certification regarding same populated with the volunteer's name may be generated and printed. Other outputs and links may be tracked by an embodiment.

An embodiment may track other events and trigger conditions to generate other outputs. As such for an activity a set of achievement parameters may be set and records for members may be updated with information for their progress towards any of the achievements. When a goal for an achievement is reached, a notification and certificate may be generated. For example, when a new member joins a group, a new membership card may be automatically generated and printed with a corresponding email message sent to the new member, from the contact information provided to the system. As such, to identify a new member, an embodiment may periodically scan the database and analyze the tenant records to find a set of records that match the activity and scan the records for a newly associated record that is now associated with the activity. Once identified, the system may generate and print a membership card and send a notification of the membership to the new member using contact information in the newly associated record.

Further, an embodiment may track conditions set for awarding certificates to participants based on a tracked achievement (e.g. such as time of participation in a group.). When a volunteer's record indicates that the volunteer has been in the group for a recognized period of time (e.g. 1, 2, 5, 10 years, etc.), then a status flag in the volunteer's record may be updated and a certificate may be generated for presentation to the volunteer with details of the volunteer's achievement (e.g. name, level of service, volunteer group name) extracted from the database and automatically populated into a template for the certificate which then can be printed. As such, manual tracking of such events is reduced. Similarly, an embodiment may track accounting data and generate invoices, statements and other reports automatically on a periodic basis (e.g. monthly) after a scan of the records in the database.

FIG. 10 shows an exemplary GUI 1000 generated on a display accessing an embodiment where input side 1002 provides fields that can be populated by a user for a search query. Once one or more or of the fields are completed, a "search" command may be activated by activating action button 1004. Upon activation of the action button, the embodiment accesses the database and generates a query based on the information provided in the fields in input side 1002. Once results are provided, output information on the results is provided in output side 1006. It will be appreciated that other GUIs may be provided providing more or less input/output options.

Another feature of an embodiment provides publicly broadcasted messages. An embodiment can periodically (e.g. daily or weekly) execute queries against the database to identify one or more activities that are scheduled to be held at a specific building. For the identified activities, at the building, a separate messaging system is provided where an electronic billboard is provided with data for announcements for upcoming activities identified in the list. The electronic billboard may be placed in a common area of the building (e.g. in the lobby or in the elevators). The messaging system can provide detailed messages of the upcoming events (e.g. name of event, location, date, time and organizer). Additional messages for the building may be provided (e.g. notices of birthdays, special events, maintenance issues, etc.). Events can be tracked and managed data in Building Service Records and Activity Records noted above with queries posted to the database to retrieve relevant building activities for a given time period. Such notifications and billboard displays can also be sent to one or more terminals provided to the tenants in the related building(s). The embodiment may filter sending the notifications and billboard information to selected terminal(s) depending on the profile of the associated user of the terminal(s) in the system.

Figure 11:
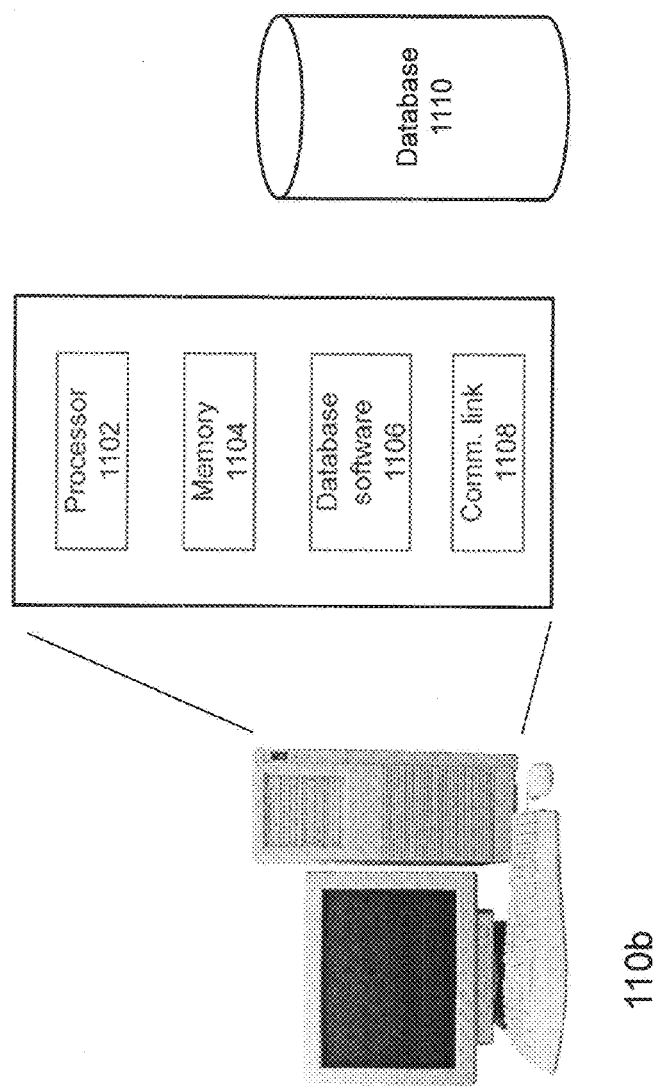
FIG. 11 is a block diagram of components of the server of FIGS. 1A and 1B according to an embodiment.

FIG. 11 shows components of an exemplary server 110*b* as provided by an embodiment. Server 110*b* is a typical microprocessor based computing machine and as such may be a stand-alone computer, a laptop, a tablet, a server or other computing devices. Server 110*b* may be accessed directly at its terminal or remotely through a communication network. Server 110*b* has microprocessor 1102, memory 1104, database software module 1106 (such as Access) and communication link module 1108. Database software module 1106 generates GUIs, accepts data and processes it for storage into database 1110, accepts input for queries in GUIs (and other sources), generates database queries based on same and generates reports and results as described above. Database 1110 stores records accessed by system 110*b* and may be contained within system 110*b* or may be accessed remotely. Database 1110 stores records and data relating associations for the tables and relationships described above. One or more functions of system 110*b* may be distributed among several devices.

It will be appreciated that the modules, processes and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signaling techniques may be used to communicate information between applications using known programming techniques. Known data storage, access and update algorithms allow data to be shared between applications.

As used herein, the wording "and/or" is intended to represent an inclusive-or. That is, "X and/or Y" is intended to mean X or Y or both.

Although the disclosure has been described with reference to certain specific embodiments, various modifications thereof will be apparent to those skilled in the art without departing from the scope of the disclosure as outlined in the claims appended hereto.

The invention claimed is:

1. A method for managing relationships among records in a database of building and tenants, comprising:
    creating and maintaining a first set of records in the database for tenants, each record in the first set of records including fields for a name, contact information, building and interests;
    creating and maintaining a second set of records in the database for buildings, records in the second set including fields for a building name, address and amenities;
    creating and maintaining a third set of records in the database for activities, records in the third set including fields for an activity name, organizer, site, participants and activity details;
    analyzing the database to identify a set of tenant records in the first set of records that match an activity in the third set; and
    generating and sending notifications using contact information in the set of tenant records relating to the activity.

2. The method for managing relationships among records in a database as claimed in claim 1, wherein:
    the notifications are email messages containing details of an upcoming event for the activity having email addresses extracted from the database from the contact information in the set of tenant records relating to the activity.

3. The method for managing relationships among records in a database as claimed in claim 1, further comprising:
    updating the set of tenant records with attendance information following an event time associated with the activity.

4. The method for managing relationships among records in a database as claimed in claim 1, further comprising:
    updating a calendar application for accounts associated with the set of tenant records with an entry related to the activity.

5. The method for managing relationships among records in a database as claimed in claim 1, further comprising:
    analyzing the database to identify members in the set of tenant records that have achieved participation levels for the activity; and
    generating and printing certificates for the members in the set having information in the certificates extracted from the records of the members in the set of tenant records.

6. The method for managing relationships among records in a database as claimed in claim 1, further comprising:
    analyzing the set of tenant records that match the activity in the database against achievement parameters associated with the activity;
    identifying records in the set of tenant records that match the activity in the database that match the achievement parameters; and
    generating and printing achievement certificates, membership cards and sending notifications using contact information in the set of tenant records relating to the activity.

7. The method for managing relationships among records in a database as claimed in claim 6, further comprising:
   updating the records in the set of tenant records that match the achievement parameters with details of the certificates.

8. The method for managing relationships among records in a database as claimed in claim 1, further comprising:
   analyzing the set of tenant records that match the activity in the database for a newly associated record that is now associated with the activity;
   generating and printing a membership card; and
   sending a notification regarding the membership using contact information in the newly associated record.

9. The method for managing relationships among records in a database as claimed in claim 1, further comprising:
   generating in a graphical user interface (GUI) on a display a bulletin providing details of the activity,
   wherein the display is located in a common area of the site associated with the activity.

10. The method for managing relationships among records in a database as claimed in claim 1, further comprising:
    receiving an electronic message from a tenant in the set of tenant records that match the activity relating to the activity containing information about the tenant and the activity; and
    updating the database to include the information about the tenant for the activity.

11. The method for managing relationships among records in a database as claimed in claim 1, further comprising:
    creating and maintaining a fourth set of records in the database for potential tenants, each record in the first set of records including fields for a name, contact information, building and desired building;
    analyzing the database to identify a set of potential tenant records in the fourth set of records that match an available unit in the second set;
    generating and sending credit requests using contact information in the set of potential tenant records to a credit agency; and
    generating and sending notifications and draft agreements using contact information in the set of potential tenant records relating to the available unit.

12. A server for managing relationships among records in a database of building and tenants, comprising:
    a microprocessor;
    a memory storage device;
    a first communication link to a database;
    a second communication link to a network; and
    a database software module for providing instructions for execution on the microprocessor to
      create and maintain a first set of records in the database for tenants, each record in the first set of records including fields for a name, contact information, building and interests;
      create and maintain a second set of records in the database for buildings, records in the second set including fields for a building name, address and amenities;
      create and maintain a third set of records in the database for activities, records in the third set including fields for an activity name, organizer, site, participants and activity details;
      analyze the database to identify a set of tenant records in the first set of records that match an activity in the third set; and
      generate and send notifications using contact information in the set of tenant records relating to the activity.

13. The server for managing relationships among records in a database as claimed in claim 12, wherein the database software module provides further instructions for execution on the microprocessor to:
    send the notifications as email messages containing details of an upcoming event for the activity having email addresses extracted from the database from the contact information in the set of tenant records relating to the activity.

14. The server for managing relationships among records in a database as claimed in claim 12, wherein the database software module provides further instructions for execution on the microprocessor to:
    update the set of tenant records with attendance information following an event time associated with the activity.

15. The server for managing relationships among records in a database as claimed in claim 12, wherein the database software module provides further instructions for execution on the microprocessor to:
    analyze the set of tenant records that match the activity in the database against achievement parameters associated with the activity;
    identify records in the set of tenant records that match the activity in the database that match the achievement parameters; and
    generate and print achievement certificates and sending notifications using contact information in the set of tenant records relating to the activity.

16. The server for managing relationships among records in a database as claimed in claim 12, wherein the database software module provides further instructions for execution on the microprocessor to:
    generate in a graphical user interface (GUI) on a display a bulletin providing details of the activity,
    wherein the display is located in a common area of the site associated with the activity.

17. The server for managing relationships among records in a database as claimed in claim 12, wherein the database software module provides further instructions for execution on the microprocessor to:
    update a calendar application for accounts associated with the set of tenant records with an entry related to the activity.

* * * * *